Oct. 7, 1958

J. S. RODGERS 2,854,865

POWER DRIVEN LAWN MOWER

Filed Nov. 19, 1954

INVENTOR.
John S. Rodgers
BY Mason, Kolehmainen,
Rathburn & Wyss
Attorneys

Oct. 7, 1958
J. S. RODGERS
2,854,865
POWER DRIVEN LAWN MOWER
Filed Nov. 19, 1954
5 Sheets-Sheet 2
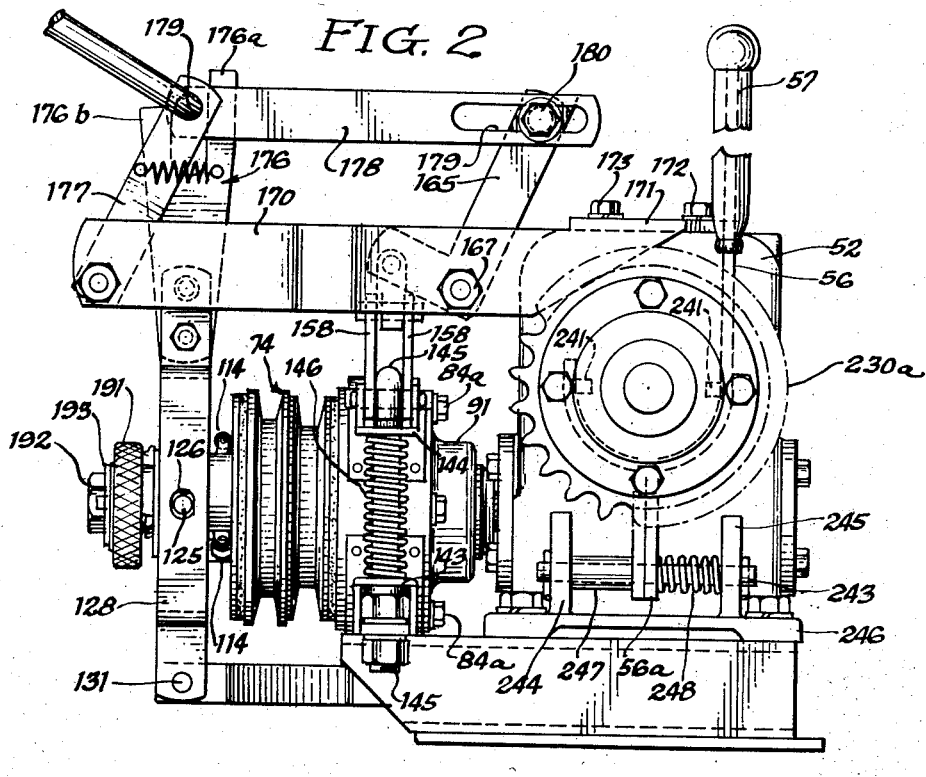
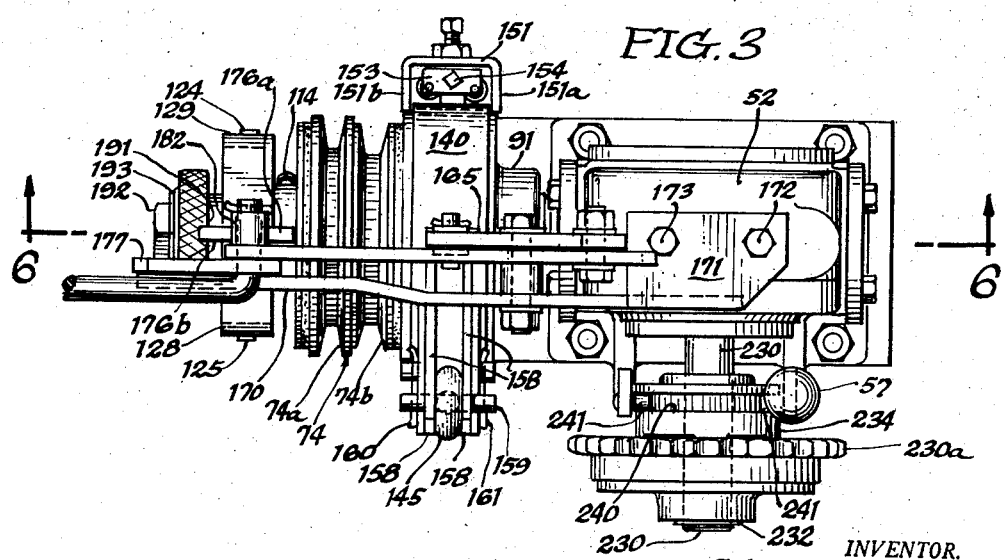
INVENTOR.
John S. Rodgers
BY Mason, Kolehmainen,
Rathburn & Wyss
Attorneys

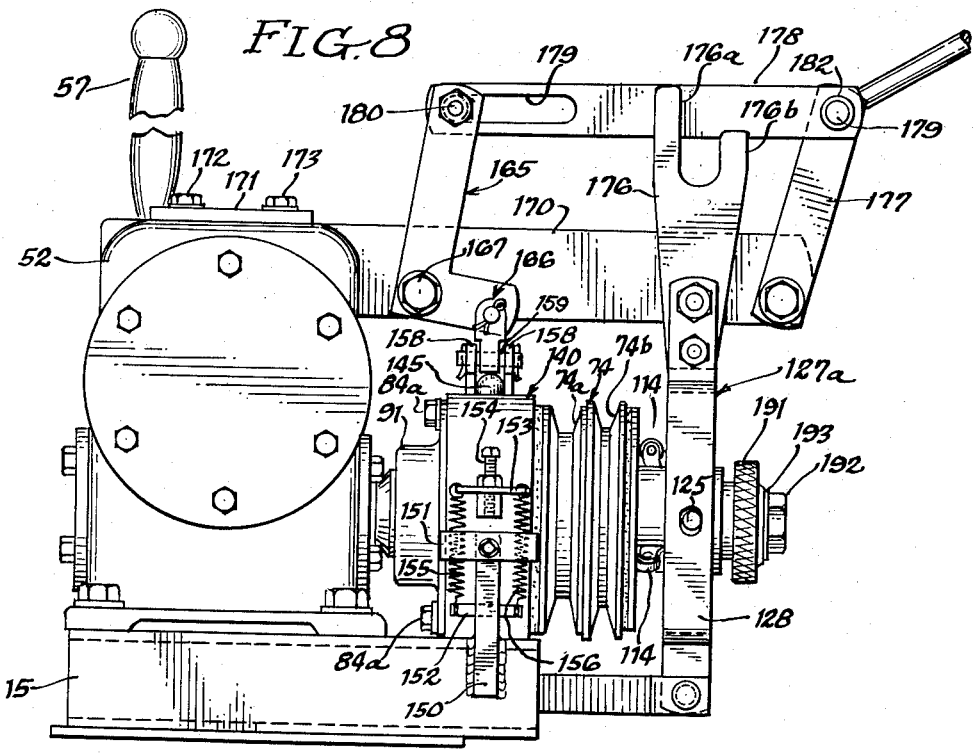

INVENTOR.
John S. Rodgers
BY
Mason, Kolehmainen,
Rathburn & Wyss
Attorneys

Oct. 7, 1958   J. S. RODGERS   2,854,865
POWER DRIVEN LAWN MOWER
Filed Nov. 19, 1954   5 Sheets-Sheet 5
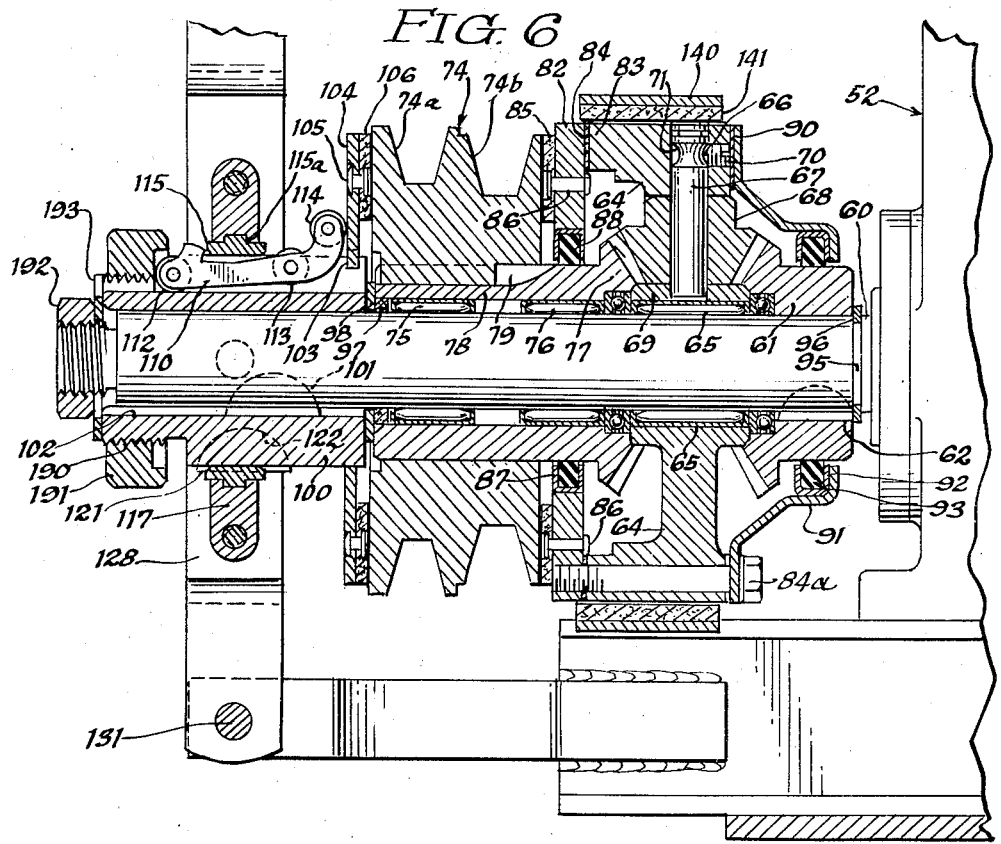
INVENTOR.
John S. Rodgers
BY
Mason, Kolehmainen,
Rathburn & Wyss
Attorneys

United States Patent Office 2,854,865
Patented Oct. 7, 1958

2,854,865

POWER DRIVEN LAWN MOWER

John S. Rodgers, Lake Park, Wis., assignor to Devere Company, Racine, Wis., a corporation of Wisconsin Application November 19, 1954, Serial No. 470,005

7 Claims. (Cl. 74—740)

The present invention relates to power driven lawn mowers and has for a principal object the provision of a new and improved power driven lawn mower which may be operated in hilly terrain without slippage between the drive wheels and the driving mechanism.

Another object of the present invention is the provision of new and improved apparatus for controlling the propulsion of a lawn mower.

Still another object of the present invention is the provision of a new and improved apparatus utilizing a single drive unit for rotating the cutting mechanism of a lawn mower and for propelling the mower over hilly terrain.

A further object of the present invention is the provision of a new and improved linkage for controlling the reverse drive mechanism of a power driven lawn mower.

Briefly, in accordance with one aspect of the present invention a dual purpose drive motor is employed to drive a lawn mower rotary cutter and also to drive a plurality of the support wheels of the mower so as to propel it over the ground. High operating efficiency may be achieved when the drive motor is operated at a relatively high speed of rotation, and conventional cutting mechanisms also operate most efficiently when driven at high speeds. Consequently, the present invention provides direct coupling between the drive motor and the cutting mechanism. However, since lawn mowers of the present type are frequently controlled by an operator who walks behind the mower, it is necessary that the mower move along the ground at a relatively low speed and, therefore, a speed reduction unit is provided between the output shaft of the drive motor and the driving wheels of the mower. It is, of course, also desirable that the operator have control of the direction of rotation of the drive wheels. For this purpose, it is known to provide a reversible power transmission mechanism between the drive motor and the driving wheels. In prior art mowers of this type, the reverse driving mechanism is provided between the output of the speed reduction unit and the driving wheels, and a friction clutch arrangement is employed to provide the desired forward, reverse and neutral positions. However, when the friction clutch is employed on the output side of the speed reduction unit, the parts thereof are rotating at a very low speed in the order of 100 R. P. M. and it has been found that when the mower is operated in hilly terrain, slippage between the output shaft of the speed reduction unit and the driving wheels occurs. In certain situations, such, for example, as where the operator intends to run the mower up and down steep hillsides, this slippage becomes so severe that there is no power transmitted through the friction clutch to the driving wheels and the mower stalls. In accordance with the present invention, a reversible drive mechanism comprising a differential gear assembly and friction clutch is used to couple the output of a dual purpose drive motor to the input of the speed reduction gear assembly. Since the friction clutch parts are rotating at a relatively high speed in the order of 1500 R. P. M. the power which can be transmitted through the clutch without producing slippage is greatly increased so that the mower can be propelled over hilly terrain without stalling. The low speed output shaft of the gear reduction assembly of the present invention is coupled to the driving wheels of the lawn mower through a free-wheeling throw-out mechanism which is provided to facilitate manual maneuvering of the mower. A three-position linkage manually operable from the handle bar of the mower is provided to permit easy and accurate control of the reversible drive mechanism of the present invention.

The invention, both as to its organization and method of operation, together with further objects and advantages thereof, will best be understood by reference to the following description taken in connection with the accompanying drawings, in which:

Fig. 2 is a side elevational view of a portion of the drive mechanism of the lawn mower of Fig. 1 shown with the clutch thereof in the neutral position;

Fig. 3 is a top elevational view of the mechanism shown in Fig. 2;

Fig. 4 is a left side elevational view of the mechanism shown in Fig. 2;

Fig. 6 is a side elevational sectional view taken along the line 6—6 of Fig. 3;

Fig. 8 is a side elevational view similar to Fig. 5 but showing the clutch mechanism in the reverse drive position;

Fig. 9 is a right side elevational view, partly in section, of the free-wheeling throw-out mechanism portion of the mechanism of Fig. 2;

Fig. 10 is a view similar to Fig. 9 and showing the throw-out mechanism in the free-wheeling position.

Figure 1:
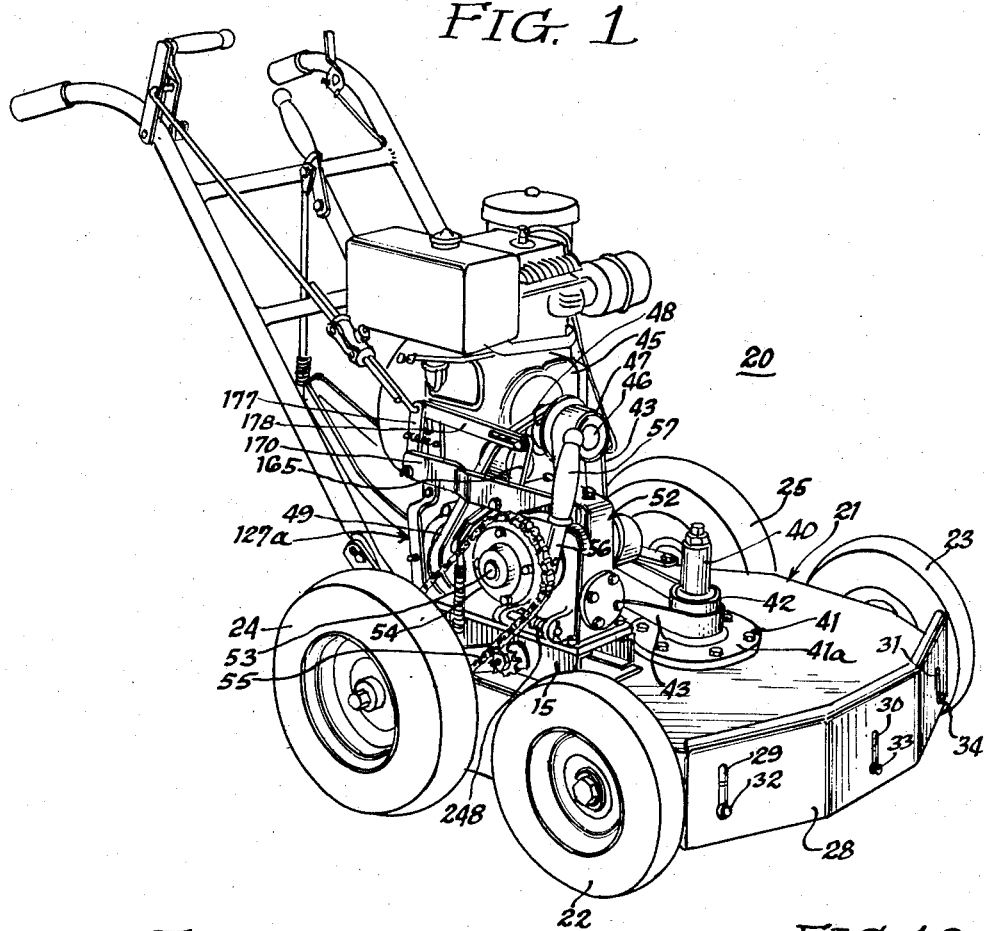
Fig. 1 is a perspective view of the rotary lawn mower embodying the features of the present invention.
Figure 11:
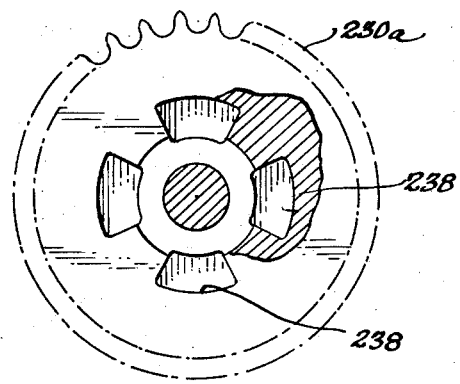
Figs. 11 and 12 are partial sectional views illustrating details of the throw-out mechanism.
Figure 12:
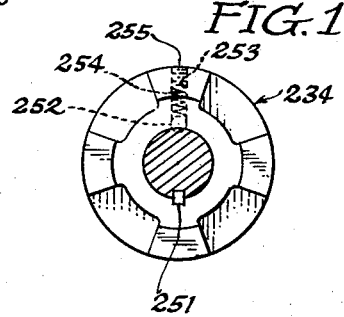

Referring now to the drawings, there is shown in Fig. 1 thereof a power driven lawn mower 20 comprising a horizontal platform 21 which is supported for movement on front wheels 22 and 23 and on rear driving wheels 24 and 25. Platform 21 is provided with a downwardly extending front wall (not shown) on which is slideably mounted for vertical movement a forward shield member 28. The shield member 28 is provided with a plurality of spaced vertical slots 29, 30 and 31 which respectively ride along the body portions of bolts 32, 33 and 34 which protrude forwardly from the front wall. The forward shield 28 is maintained in any particular position with respect to the ground by tightening the bolts 32, 33 and 34. Platform 21 is also provided with downwardly extending side and rear walls which define a space in which is located one or more cutting blades connected for rotation with a vertically disposed shaft 40 which extends both above and beneath the platform 21. A bearing member 41 including an outwardly extending flange 41a is mounted on the upper side of the platform 21 and supports the shaft 40 for rotation therein. A pulley 42 is attached above the platform 21 to the shaft 40 for rotation therewith and is driven by means of a continuous belt 43. The horizontal platform 21 also supports a dual purpose driving motor 45 which has an output shaft 46 on which is located a pair of pulleys 47 and 48. The belt 43 is driven by the pulley 47 which is of substantially the same diameter as the pulley 42 on the shaft 40. Consequently, there is provided a one to one drive ratio between the output shaft of the driving motor 45 and the cutting mechanism located on the shaft 40, and the motor 45 may be operated at a relatively high speed. A continuous belt 49 is driven by the pulley 48 and couples power from the dual purpose driving motor 45 to a reverse driving mechanism to be described in more detail hereinafter, the output of the reverse driving mechanism being connected to a conventional gear reduction unit 52 which is provided with a low speed output shaft 53 on which is located a driving sprocket 54. A continuous chain 55 is adapted to be driven by the sprocket 54 and drives a sprocket (not shown) which is attached to the driving wheels 24 and 25. A throw-out mechanism is provided between the shaft 53 and the sprocket 54 to provide the hereinbefore mentioned free-wheeling action. This free-wheeling mechanism is operable by means of the lever 56 on which is provided the hand grip 57.

Since the conventional rotary cutting mechanisms as used in power lawn mowers are designed for rotation in only one direction, it is not feasible to reverse the direction of rotation of the driving motor 45 in order to reverse the direction of rotation of the driving wheels 24 and 25. Consequently, to reverse the direction of rotation of the drive sprocket 54 which is coupled to the output shaft of the speed reduction unit 52 it is necessary to reverse the direction of rotation of the input shaft 60 (Fig. 6) of the speed reduction unit 52. Therefore, a reversible drive mechanism which is adapted to be driven by means of the continuous belt 49 is positioned ahead of the input shaft 60 of the speed reduction unit 52, and the shaft 60, which is supported from within the gear reduction unit 52, extends horizontally therefrom and supports this reversible drive mechanism. The reversible drive mechanism comprises a first bevel gear 61 which is supported on the shaft 60 in close proximity to the gear reduction unit 52 and is keyed to the shaft 60 by means of a Woodruff key 62. The bevel gear 61 forms a part of a differential assembly which also includes a carrier ring or spider 64 supported for rotation about the drive shaft 60 on a sleeve bearing 65. The carrier ring 64 is provided with a plurality of radially extending bores 66 adapted to receive the differential bearing shafts 67, each of which supports a differential bevel gear 68. The differential bevel gears 68 are adapted to mesh with the bevel gear 61 when the sleeve bearing 65 is correctly positioned on the drive shaft 60. The radially extending bearing shafts 67 are journalled at their inner ends in the collar 69 which is carried by the sleeve bearing 65, and these radially extending shafts are preferably locked against rotation by means of set screws 70 which engage the annularly grooved portion 71 in the outer ends of the shafts 67.

In order to support a drive pulley 74 on the drive shaft 60 and to permit rotation of the pulley 74 in a direction opposite to that of the drive shaft 60, there is provided a pair of flanged sleeve bearings 75 and 76 which carry a second bevel gear 77 thereon for free rotation with respect to the drive shaft 60. The bevel gear 77 is provided with an extended hub portion 78 which extends toward the outer end of the drive shaft 60 and carries the drive pulley 74 thereon, the pulley 74 being conveniently keyed to the hub 78 by means of a key 79 adapted to be received in a mating keyway in the pulley housing near the center thereof.

In order to engage the pulley 74 with the carrier ring 64 so that these two members may be rotated as a unit and the drive shaft 60 directly driven by the pulley 74, there is provided an annular supporting disk or clutch plate 82 which is positioned on an outwardly extending flange portion 83 of the carrier ring 64 and is secured to the carrier ring 64 by means of a plurality of bolts 84a. The face of the annular disk 82 which faces toward the extending flange portion of the carrier ring 64 is separated from the carrier ring by means of an annular lubrication seal 84, and the opposite face of the annular supporting disk 82 is provided with an annular friction clutch band 85 which is secured to the disk 82 by means of a plurality of spaced eyelets 86.

In order to maintain a lubrication seal between the inner edge of the disk 82 and the hub portion of the bevel gear 77, there is provided a shaft seal comprising an inwardly channelled ring 87 which supports a resilient sealing ring 88 of the type known generally as an O-ring. The carrier ring 64 is provided with an annular sealing ring 90 which is attached thereto by means of the bolts 84a. An end housing member 91 has a central aperture therein adapted loosely to engage the hub portion of the beveled gear 61, and the inner end of the housing 91 is adapted to engage an inwardly channelled seal supporting ring 92 which supports within the channel thereof an O-ring 93 which is similar to the O-ring 88. Consequently, the lubricant provided in the differential housing cannot escape along the hub portions of the beveled gears 77 and 61. Furthermore, the sealing rings 84 and 90 prevent leakage of the lubricant along the periphery of the carrier ring 64. An annular groove or keyway 95 is provided in the shaft 60 near the speed reduction unit 52 and an annular key 96 is provided therein to provide a stop which prevents movement of the reversible drive mechanism into engagement with the end of the speed reduction unit 52. An annular resilient lubrication seal 97 is provided between the end of the hub portion 78 of the bevel gear 77 and the drive shaft 60. The sealing ring 97 is held within the inner portion of the hub 78 by means of a self-supporting annular washer 98 which rides freely on the drive shaft 60.

In order to permit variations in the speed of locomotion of the lawn mower without varying the speed of the drive motor 45, the drive pulley 74 is provided with first and second V-shaped grooves 74a and 74b of different diameters. To drive the shaft 60 in unison with the pulley 74 there is provided a clutch drive assembly including a journal 100 which is keyed to the drive shaft 60 by means of a Woodruff key 101 adapted to be received in a slot 102 which extends longitudinally along the entire length of the journal 100. Consequently, the journal 100 is laterally moveable along the drive shaft 60. A groove 103 is provided in the outer surface of the journal 100 near the inner end thereof and is adapted to receive a clutch plate assembly including an annular clutch plate 104 which has an annular clutch facing member 106 fastened thereto by means of a plurality of eyelets 105. The eyelets 105 are countersunk in the clutch facing 106 to prevent rubbing thereof on the clutch face of the drive pulley 74. It may therefore be seen that when the journal 100 is moved laterally along the shaft 60 towards the gear reduction unit 52 the clutch assembly is pressed against the pulley 74 which is in turn moved into engagement with the clutch facing 85 so that the entire reversing drive unit, including the drive shaft 60, the carrier ring 64 and the journal 100 rotate in unison with the pulley 74.

In order to exert sidewise pressure on the clutch plate 104, the journal 100 is provided with a plurality of slots about the periphery thereof, each of which is adapted to receive a camming finger 110. The camming fingers 110 are provided with wheels 112, 113 for engagement in the slots of the journal 100 and the forward ends of the fingers 110 are also provided with rotatably mounted wheels 114. An annular collar 115 is provided with a central aperture adapted to coact with the camming fingers 110 as the collar 115 is moved toward the clutch plate 104 thereby to force the clutch assembly into contact with the outer face of the pulley 74. The collar 115 is loosely fitted over the camming fingers 110, and the journal 100 is held in place by means of a pair of semi-circular sleeves 117 and 118 (Fig. 4) bolted together at opposite ends thereof by means of bolts 119 and 120. The collar 115 is fastened to the journal 100 for rotation therewith by means of a central keyway provided in the collar and adapted to receive a Woodruff key 121 which is engaged in a semi-circular groove 122 provided in the outer surface of the journal 100. The collar 115 is also provided with an annular outstanding portion 115a (Fig. 6) which is adapted to be received in an internal annular groove in the semi-circular sleeve members 117 and 118. This outstanding portion and cooperating groove provides a means for externally moving the camming collar 115 with respect to the camming fingers 110 and the journal 100. The semi-circular supporting sleeves 117 and 118 are provided with projecting pins 124 and 125 (Fig. 4) at the sides thereof which are positioned substantially in line with the principal axis of the drive shaft 60 and are journalled in collars 126 and 127 provided in side members 128 and 129 of a linkage carriage 127a which is pivotally mounted at the bottom thereof on a bolt 131 which is rigidly supported with respect to the platform 21 of the mower. It may thus be seen that movement of the carriage 127a towards or away from the speed reduction unit 52 causes coupling or decoupling between the drive pulley 74 and the drive shaft 60.

In order to drive the shaft 60 in a direction opposite to the direction of rotation of the drive pulley 74, there is provided an arrangement whereby the drive pulley 74 rotates freely with respect to the drive shaft 60 and transmits torque to the shaft 60 through the hereinbefore described differential mechanism. Thus, the carrier ring 64 is clamped in a fixed position so that the beveled gear 61 is driven in the opposite direction from the driving bevel gear 77 through the pinion gears 68. In order to clamp the carrier ring 64, there is provided a split annular brake band 140 (Fig. 6) which is provided on the inner surface thereof with a split friction band 141 adapted to ride on the outer surface of the differential ring 64. This friction band 141 is secured to the brake band 140 by any conventional means, such, for example, as by bonding or riveting. Extending outwardly from the brake band 140 on opposite sides of and adjacent to the split therein, there is provided a pair of ears 143 and 144 (Fig. 4) which are connected to the brake band 140 by any convenient means, such, for example, as by welding. The ears 143 and 144 are provided with aligned apertures and a bolt 145 extends therethrough to act as a stop in the movement of the brake band 140 away from the carrier ring 64. To provide a bias for holding the friction band 141 free of the carrier ring 64, a helical compression spring 146 is coiled about the body portion of the bolt 145 and is located between the ears 143 and 144.

A lug 149 extends outwardly from the brake band 140 opposite the split therein. The bed member 15 (Fig. 1) which is directly supported on and attached to the horizontal platform 21 supports an upstanding member 150 which has attached thereto a bracket 151. Fingers 151a and 151b (Fig. 3) extend inwardly toward the brake band 140 and are adapted to engage the edges thereof should the brake band 140 be moved laterally with respect to the carrier ring 64. The bracket 151 and the fingers 151a and 151b thus form a channel which serves as a stop or guide to maintain the brake band 140 in proper alignment with the carrier ring 64 so that a relatively uniform friction engagement between the brake band 140 and the carrier ring 64 may be effected.

In order to resiliently connect the lug 149 to the bed member 15, there is provided a stud 152 extending outwardly from both sides of the upright member 150 parallel with the longitudinal axis of the drive shaft 60. Attached to the lug 149 is a rectangularly shaped plate member 153 and a pair of helical springs 155 and 156 are interposed between the ends of the stud 152 and the plate 153. It will thus be seen that when pressure is exerted downwardly on the ear 144 the brake band 140 is brought into engagement with the outer surface of the carrier ring 64 so that the only coupling between the drive pulley 74 and the drive shaft 60 is through the differential, which thereby transmits a reverse torque to the speed reduction unit 52.

In order to provide a downward force on the ear 144, a link member 158 is pivotally attached at one end to the bolt 145 by means of a stud 159 held in place by a pair of conventional cotter pins 160 and 161. The link 158 is pivotally connected at its other end to the short arm of a bell crank 165. This pivotal connection may conveniently be provided by means of a stud and linkage arrangement 166 (Fig. 8.) The bell crank 165 is pivotally supported at a point intermediate the arms thereof on a stud 167 which is mounted on and extends from a support arm 170 which is rigidly fastened to the top of the speed reduction unit 52 by means of an offstanding flange portion 171 and a pair of headed studs 172 and 173 which are threaded into the top of the housing of the speed reduction unit 52. Therefore, to reverse the direction of movement of the lawn mower by clamping the brake band 140 around the carrier ring 64, the upper end of the bell crank 165 is moved toward the rear of the mower which forces the bolt 145 and, consequently, the off-standing ear 144 downwardly. To cause a forward drive of the lawn mower, the sleeve support carriage 127a is moved toward the front of the mower which thereby causes engagement between the clutch bands and the drive pulley 74 to cause direct coupling between the pulley 74 and the drive shaft 60. When neither the brake band nor the clutches are engaged, the drive unit is in a neutral position and there is no torque coupled from the drive pulley 74 to the drive shaft 60.

Figure 5:
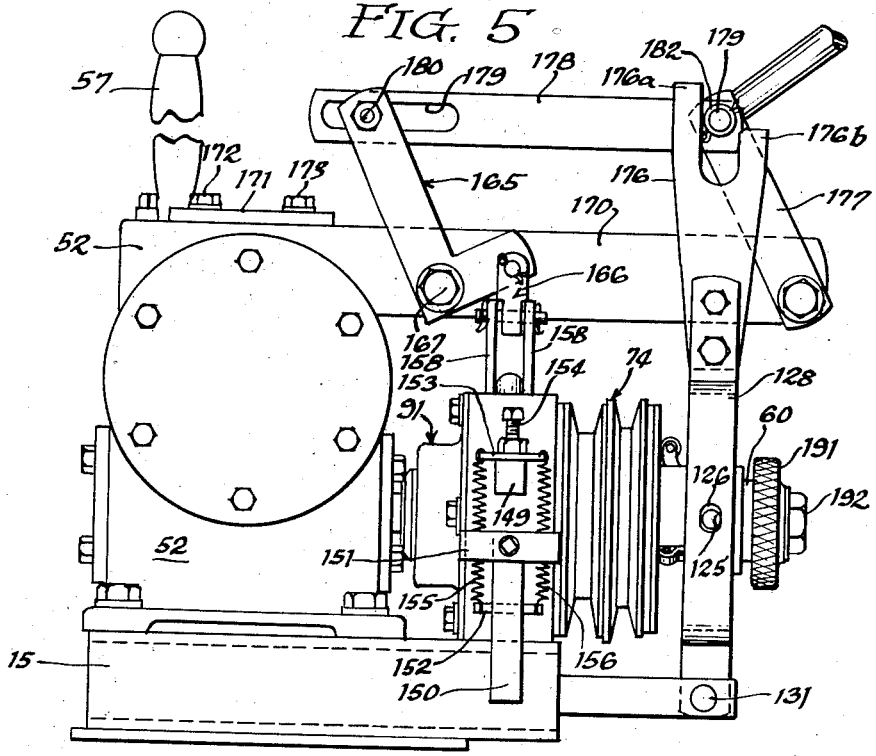
Fig. 5 is a rear elevational view of the mechanism of Fig. 2.
Figure 7:
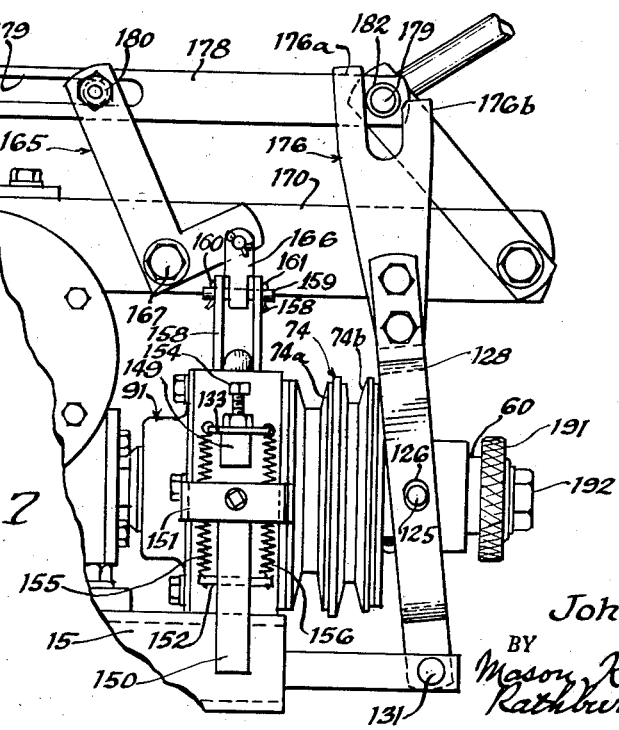
Fig. 7 is a fragmentary side elevational view similar to Fig. 5 but showing the clutch mechanism in the forward drive position.

In order to pivot the carriage members 128 and 129 on the pivot bolt 131 so as to press the clutch assembly against the drive pulley 74, a lever 176 is attached at its lower end to the upper portion of the carriage 127a and is bifurcated at the upper end thereof to provide the arms 176a and 176b. A cross arm 177 is pivotally attached at an end thereof to the support arm 170 and is equal in length to the upper extending arm of the bell crank 165. A control arm 178 is pivotally attached at the rearward end thereof to the upper end of the cross arm 177 by means of a stud 179. The forward end of the control arm 178 is slotted along the principal axis thereof at 179 to accommodate a stud 180 extending from the end of the upper arm of the bell crank 165. When the control arm 178 is moved horizontally in a forward direction, the bell crank 165 is pivoted about the stud 167 so as to raise the bolt 145 and thereby disengage the brake band 140 from the carrier ring 64. At the same time, the stud 179, which is provided with a sleeve 182 (Fig. 5), engages the forward arm 176a of the lever 176. The rearward arm 176b is shorter in length than the forward arm 176a so that when the control element 178 is moved in a rearward direction the stud 179 and overriding sleeve 182 may pass thereby without exerting any rearward force on the lever 176. When, however, the control arm is moved in the forward direction the sleeve 182 abuts against the forward arm 176a, thereby pivoting the carriage 127a upon the pivot stud 131 so that the clutch plate assembly 104, 106 is forced against the drive pulley 74 for forward movement of the mower. As best illustrated in Fig. 7, when the control linkage is in the forward position so that the lever 176 and the support carriage 127a are tilted forward, the split sleeve assembly and the associated collar 115 are forced into engagement with the camming fingers 110 which compress the clutch plate assembly against the drive pulley 74. At this same time it will be seen that the bell crank 165 is also moved into a forward position so that the brake band 140 is disengaged from the carrier ring 64.

Referring to Fig. 8, the reverse drive mechanism is therein illustrated in the reverse drive position whereby the brake band 140 is engaged with the differential ring 64. In this position it will be observed that the control arm 178 is moved in a rearward direction so that the forward end of the slot 179 engages the stud 180 pivoting the bell crank 165 about the stud 167 and thereby forcing the lug 144 downwardly causing engagement of the brake band 140 with the carrier ring 64. It will also be observed that the bifurcated end of the lever 176 permits the stud 179 and associated sleeve 182 to pass out of engagement therewith to permit the use of the high mechanical advantage bell crank lever 165.

The outer end of the journal 100 is provided with a male threaded portion 190 (Fig. 6) which is adapted to receive a knurled female nut 191 which permits adjustment of the relative positions of the camming fingers 110 and the journal 100. The journal 100 and the other portions of the reverse drive mechanism are moved laterally toward the annular key 96 and held tightly thereto by means of a nut 192 which is threadedly engaged on the end of the shaft 60. A lock washer 193 is provided intermediate the nut 192 and the journal 100 to lock the nut 192 in place.

Considering now the operation of the above described reversible drive mechanism and its associated control linkage, it will be evident from the foregoing description that the collar supporting carriage 127a and the differential ring clamping assembly may be controlled in unison by movement of the control arm 178 to effect a corresponding pivotal movement of the bell crank lever 165. When the carriage arms 128 and 129 occupy the position shown in Fig. 5, the transmission is in the neutral position and no torque is transmitted to the driving wheels 24 and 25. When the control arm 178 is moved forwardly to the position shown in Fig. 7, the carriage arms 128 and 129 force the camming collar 115 into engagement with the camming fingers 110 so that the pulley 74 is clamped to the carrier ring 64 and to the journal 100 which is in turn keyed to the shaft 60. With the pulley and differential ring thus securely clamped together, the belt 49 drives these elements as a unit. The above described position of the collar supporting carriage may be termed the forward position, and in this position it is essential that the brake band 140 be disengaged from the periphery of the carrier ring 64 so as to permit the above described rotation of the bevel gear 77 and the carrier ring 64. Accordingly, when the carriage is in the forward position the bell crank 165 is so positioned as to disengage the brake band 140 from the carrier ring 64.

When the control arm 178 is moved rearwardly to the position shown in Fig. 8, the carriage 127a is moved to the right by a sufficient amount to disengage the camming collar 115 from the end portions of the camming fingers 110, thus releasing the side thrust exerted by the camming fingers 110 on the clutch assembly 104, 106. Also, when the control arm 178 is moved into this position, the bell crank 165 is rotated to a position whereby a downward thrust is exerted on the ear 144 extending outwardly from the brake band 140 so that engagement between the brake band 140 and the outer periphery of the carrier ring 64 is effected.

Because of the relatively high speed of rotation of the pulley 74 and the associated clutch surfaces 106 and 85, a high mechanical advantage is obtained with respect to the driving wheels 24, 25 which are rotated at a relatively slow speed such as 100 R. P. M. Therefore, there is no slippage between the clutch surfaces 106, 85 and the drive pulley faces when a high torque is transmitted thereby. However, since the reversible drive mechanism is located on the input side of the speed reduction unit 52, it is necessary to provide a clutch mechanism between the output shaft of the speed reduction unit 52 and the drive wheels 24, 25 because the usual type of speed reduction unit includes a worm and worm wheel arrangement which cannot be driven from the output side thereof. This clutch mechanism is shown in Figs. 9 to 12, inclusive, as being positioned on the low speed output shaft 230 of the speed reduction unit 52. The drive sprocket 54 is loosely positioned on the shaft 230 and is provided with a plurality of teeth 230a adapted to engage the drive chain 55 which is connected to a similar sprocket located on the rear axle of the mower. An annular groove is provided at the approximate end of the shaft 230 and is adapted to receive a split ring key 232 which prevents the sprocket 54 from slipping off the shaft 230.

In order to provide a clutch whereby the sprocket 54 may be disengaged from the shaft 230, there is provided a forked member 234 having a central bore slightly exceeding the diameter of the shaft 230 which is provided with a longitudinally extending keyway 235. The keyway 235 is adapted to receive a Woodruff key 236 so that the forked member 234 is free to move laterally along the shaft 230. An annular groove is provided in the shaft 230 and adapted to receive a key 237 to prevent movement of the sprocket 54 towards the gear reduction unit. The inner face of the sprocket 54 is provided with a plurality of recesses 238 (Fig. 11) adapted to engage the outstanding portions of the forked member 234. When the forked member 234 is moved into engagement with the sprocket 54 the sprocket rotates in unison with the output shaft 230 of the speed reduction unit 52. When, however, the forked member 234 is slid inwardly toward the speed reduction unit 52 along the key 236, the outstanding portions do not engage the recesses 238 in the sprocket 54 and the sprocket is, therefore, free to rotate with respect to the shaft 230.

To provide a convenient means for moving the forked member 234 into and out of engagement with the sprocket 54, the clutch member is provided with an annular recess 240 (Fig. 9) which is adapted to engage a pair of studs 241 (Fig. 3) extending inwardly from the arm of the bifurcated lever 56. The lever 56 is pivoted at the bottom on a stud 243 which is mounted between upstanding members 244 and 245 (Fig. 2) which are attached through a bed plate 246 to the bed member 15. In order to center the lever 56 with respect to the forked member 234 so as to reduce the friction between the walls of the groove 240 and the pins 241, a sleeve 247 (Fig. 2) is positioned between the downwardly extending portion 56a of the bifurcated lever 56 and the upstanding portion 244, and a helical spring 248 is coiled over the stud 243 between the upstanding member 245 and the other side of the downwardly extending portion 56a of the lever 56. In order to hold the forked member 234 in one of its two positions, a pair of annular grooves 250 and 251 (Fig. 10) are provided in the shaft and adapted to engage a steel ball 252 which is provided in a radial bore 253 located in the forked member 234. The steel ball 252 is held in engagement with one of the grooves 250, 251 by means of a spring 254 and set screw 255.

Considering now the operation of the free-wheeling throw-out arrangement, it will be evident from the foregoing description that when the forked member 234 is moved into engagement with the sprocket 54 so that the steel ball 252 is pressed into the groove 250, the drive sprocket 54 is directly connected to the drive shaft 230. In this position, rotation of the drive wheels 24, 25 cannot be effected without rotation of the input shaft to the speed reducing unit 52. When, however, the lever 56 is moved inwardly (Fig. 10) so that the steel ball 252 is engaged in the groove 251, the outstanding portions of the forked member 234 do not engage the recesses 238 in the sprocket 54, and the sprocket 54 is free to rotate with respect to the output shaft 230. Consequently, the lawn mower may be readily maneuvered when the drive motor is inoperative by merely moving the lever 56 towards the center of the machine. During normal operation, when the lever is in the outward position, the forked member 234 rotates with the shaft and the pins 241 ride in the groove 240. Because the output shaft 230 is rotated at low speed, a good bearing surface between the pins 241 and the groove 240 is not required and a relatively simple, inexpensive clutch arrangement is provided for free-wheeling action between the drive wheels 24, 25 and the low speed output shaft 230 of the speed reducing unit 52.

While the invention has been described by means of a particular embodiment thereof, it will be understood by those skilled in the art that many changes and modifications may be made without departing from this invention. Therefore, the appended claims are intended to cover all such changes and modifications as fall within the true spirit and the scope of the invention.

What is claimed as new and is desired to be secured by Letters Patents of the United States is:

1. A power mower comprising a drive motor mounted on said mower, a reversible drive mechanism, speed reducing means, means including a controllably operable friction clutch for driving said reversible drive mechanism from the output of said motor, means for driving said speed reducing means from the output of said reversible drive mechanism, a drive wheel rotatably mounted on said mower for propelling said mower along the ground, and means for driving said wheel from the output of said speed reducing means, said means for driving said wheel including positive acting clutch means for controllably disconnecting said wheel from said speed reducing means.

2. In a power mower of the type having a drive motor mounted on a platform which is supported off the ground by a plurality of rotatable wheels, speed reducing means having an input shaft and an output shaft, means including a friction clutch and reverse drive mechanism adapted to couple torque from the output of said motor to the input shaft of said speed reducing means, a driving connection between the output shaft of said speed reducing means and at least one of said wheels, and manually operable positive acting clutch means for controllably disconnecting the output shaft of said speed reducing means from said driving connection.

3. In a power driven lawn mower of the type having a reverse drive mechanism controlled in response to pivotal movement of a first member and lateral movement of a second member, the combination of a supporting structure, a bracket supported on and extending from said supporting structure, a lever pivotally supported intermediate the ends thereof on said bracket, one end of said lever being pivotally connected to said second member, a control arm being connected through a lost motion connection to the other end of said lever, and means attached to said control arm and adapted to operatively engage said first member in a first position and to be operatively disengaged from said first member in a second position.

4. In a power driven lawn mower of the type having a reverse drive mechanism controlled in response to pivotal movement of a first member and lateral movement of a second member, the combination of a supporting structure, a bracket extending from said supporting structure, a control arm connected to said bracket by means of pivotally connected cross members, a lost motion connection interposed between one of said members and said control arm, said one of said members having a portion extending beyond its connection point with said bracket, said portion being connected to said second member, and a lost motion connection between said control arm and said first member.

5. In a power driven lawn mower of the type having a reverse drive mechanism controlled in response to pivotal movement of a first member and lateral movement of a second member, the combination of a supporting structure, a bracket supported on and extending from said supporting structure, a control arm moveably connected to said bracket by means of pivotally attached cross members, one of said members being a bell crank with the fulcrum pivotally attached to said bracket, one end of said bell crank being connected through a lost motion connection to said bracket and the other end thereof being connected to said second member, and a lost motion connection between said control arm and said first member.

6. In a power mower of the type having a drive motor mounted on a platform which is supported off the ground by a plurality of rotatable wheels, the combination of speed reducing means having an input and an output shaft, a driving connection including a throw-out mechanism connected between the output shaft of said speed reducing means and at least one of said wheels, and a reverse drive mechanism interposed between said drive motor and said speed reducing means, said reverse drive mechanism having a driving pulley adapted to be driven by said drive motor, a differential, said pulley adapted to drive said differential, means for locking the carrier ring of said differential, means for directly connecting said pulley to the input of said speed reducing means, and means adapted to drive said speed reducing means from the output of said differential.

7. In a power lawn mower of the type having a drive motor mounted on the mower, the combination of a reversible power transmission unit driven by said motor, said unit including a differential gear assembly and friction brake means for selectively engaging the carrier ring of said differential gear assembly to prevent rotation of said carrier ring and thus to reverse the direction of rotation of the output element of said differential gear assembly, a speed reduction unit driven by said output element, and means including a throw-out mechanism driven by said speed reduction unit for propelling said motor.

References Cited in the file of this patent

UNITED STATES PATENTS

| | | |
|---|---|---|
| 1,961,710 | Pol | June 5, 1934 |
| 2,138,239 | Irgens | Nov. 29, 1938 |
| 2,189,109 | Hacker | Feb. 6, 1940 |
| 2,194,297 | Drumm | Mar. 19, 1940 |
| 2,238,006 | Attridge | Apr. 8, 1941 |
| 2,370,484 | Nabstedt | Feb. 27, 1945 |
| 2,556,739 | Polsen | June 12, 1951 |
| 2,634,629 | Hawkins | Apr. 14, 1953 |
| 2,674,220 | Ware | Apr. 6, 1954 |
| 2,701,436 | Harnett | Feb. 8, 1955 |